Joseph H. Rudd
INVENTOR.

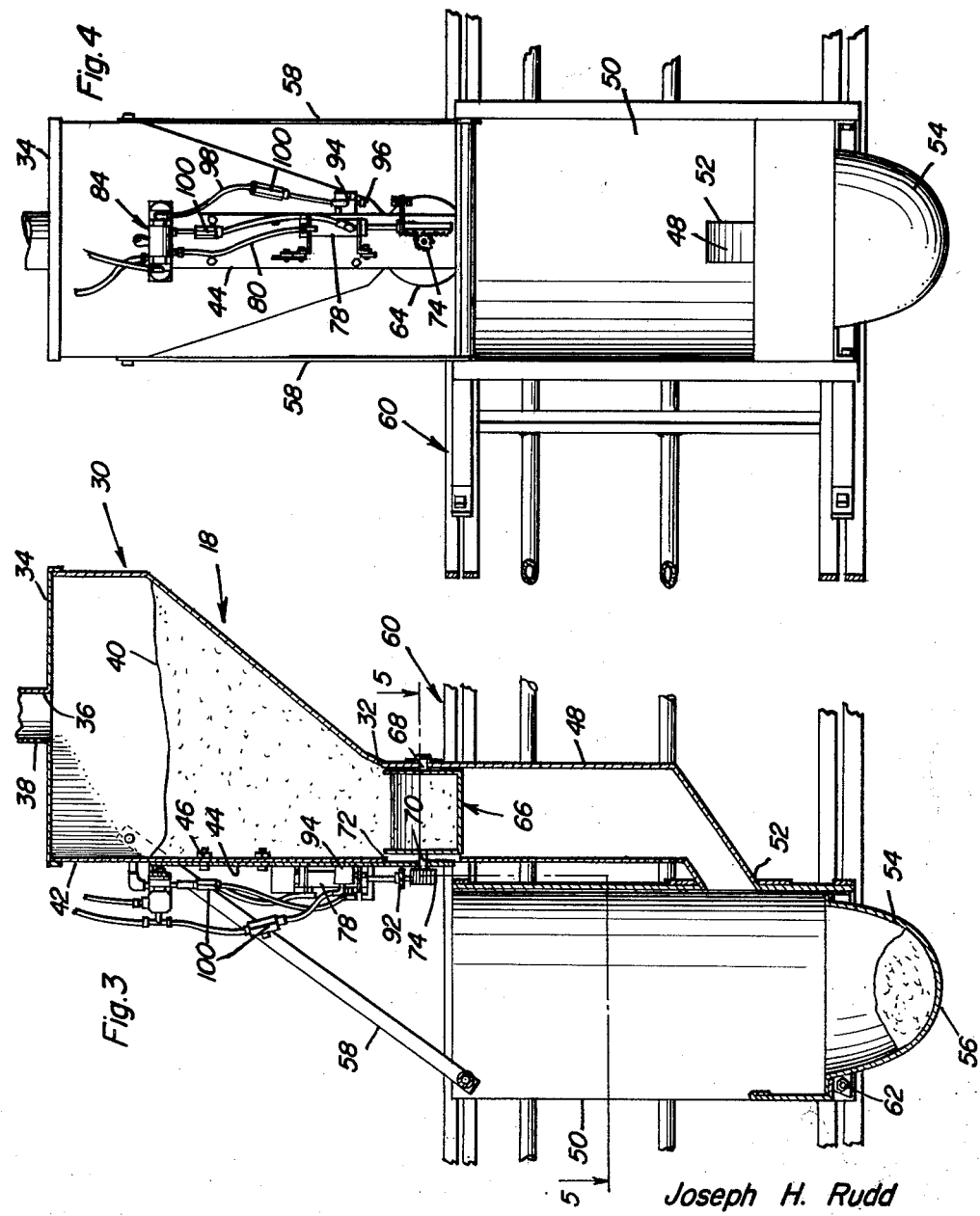

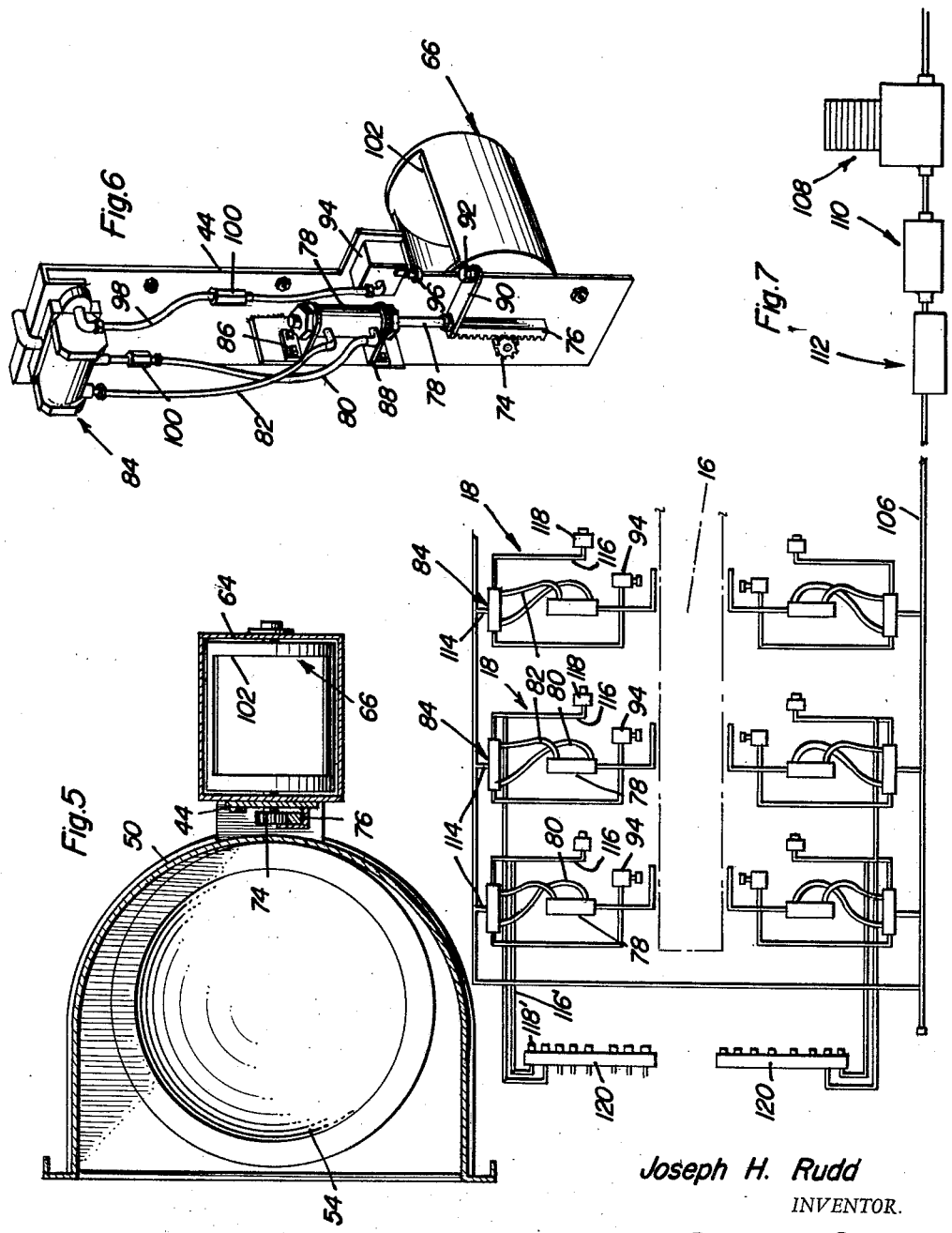

United States Patent Office 3,131,673
Patented May 5, 1964

3,131,673
SELECTIVELY CONTROLLED FEEDER
Joseph H. Rudd, Manteca, Calif. (Box 537, Ripon, Calif.)
Filed Feb. 24, 1961, Ser. No. 91,401
3 Claims. (Cl. 119—56)

This invention relates to new and useful improvements in selectively controlled feeders such as those used in connection with the feeding of milk cows.

Although it is to be understood that this invention may also be used for other dispensing purposes, it has been designed primarily for use in feeding milk cows during the time they are in their milking stalls within the milking barn.

It is conventional to feed milk cows quantities of feed during the time they are being milked by automatic milking equipment. The feeding of the cows places them more at ease and as a result their milk yield is greater. The selectively controlled feeder of the instant invention is specifically adapted to provide a means by which predetermined measured quantities of feed may be dispensed into feeding receptacles from remote positions. The selectively controlled feeder is provided with an actuating mechanism including controls therefor which have been designed to enable the controls to be placed in a position remote from the feed receptacle whereby workmen handling the milking equipment may manipulate the feeder controls and dispense a measured quantity of feed into the feed receptacle whenever such dispensing of feed is desired.

Not only do the controls for the feeder include means for controlling the operation of the feeder from a remote position, but the controls also include means whereby an individual feeder may be controlled from two positions remote from the feeder and from each other.

In conjunction with providing an improvement in selectively controlled feeders for milk cows, the present invention includes a means for positioning the cows to be milked whereby workmen in a central position may have access to each cow and access to the controls for dispensing feed to each feed receptacle servicing each cow. By arranging the stalls in the milking barn in a manner whereby workmen may operate the milking machines attached to each cow from one central location, a larger number of cows may be milked by each workman thereby greatly facilitating the milking process and reducing the cost thereof.

It is the main object of this invention to provide an improved manner for dispensing measured quantities of feed to feed receptacles from which a plurality of milking cows may eat during the period they are being milked.

A further object of this invention, in accordance with the immediately preceding object, is to provide a control means for the feeders which may be actuated from one or more positions remote from the feeders.

A still further object of this invention is to provide a novel arrangement of the milking stalls and a centrally located area from which workmen may have access to each cow.

A further object of this invention is to provide the central area for workmen with controls for operating the dispensing means of the feeder whereby the workmen in the central area attaching the automatic milking apparatus to the cows may at their discretion supply the cows with predetermined quantities of feed.

Still another object of this invention is to provide an actuating means for the feed dispensing mechanisms which will be of simple construction and easy to operate so as to provide a device which will be dependable in operation and operable by any of the workmen handling the milking equipment.

An ancillary object of this invention is to provide a feed reservoir for each of the feeders and a means for mounting the dispensing means and actuating means therefor on the corresponding reservoir in a manner whereby the dispensing means and actuating means may be readily removed from the reservoir.

A final object to be specifically enumerated herein is to provide a device which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged vertical sectional view of one of the feeder units taken substantially upon the plane indicated by the section line 3—3 of FIG. 1;

FIGURE 4 is a fragmentary enlarged front elevational view of one of the feeder units;

FIGURE 5 is a horizontal sectional view of one of the feeder units on somewhat of an enlarged scale taken substantially upon the plane indicated by the section line 5—5 of FIGURE 3.

FIGURE 6 is an enlarged perspective view of the dispensing means and actuating means therefor showing the manner in which the dispensing and actuating means may be removed as a unit from the associated feed reservoir; and FIGURE 7 is a diagrammatic view of the control system for the plurality of feeder units illustrating the manner in which each of the feeder units may be controlled from two remote positions and the manner in which the feeding units are disposed about a central area.

Figure 1:
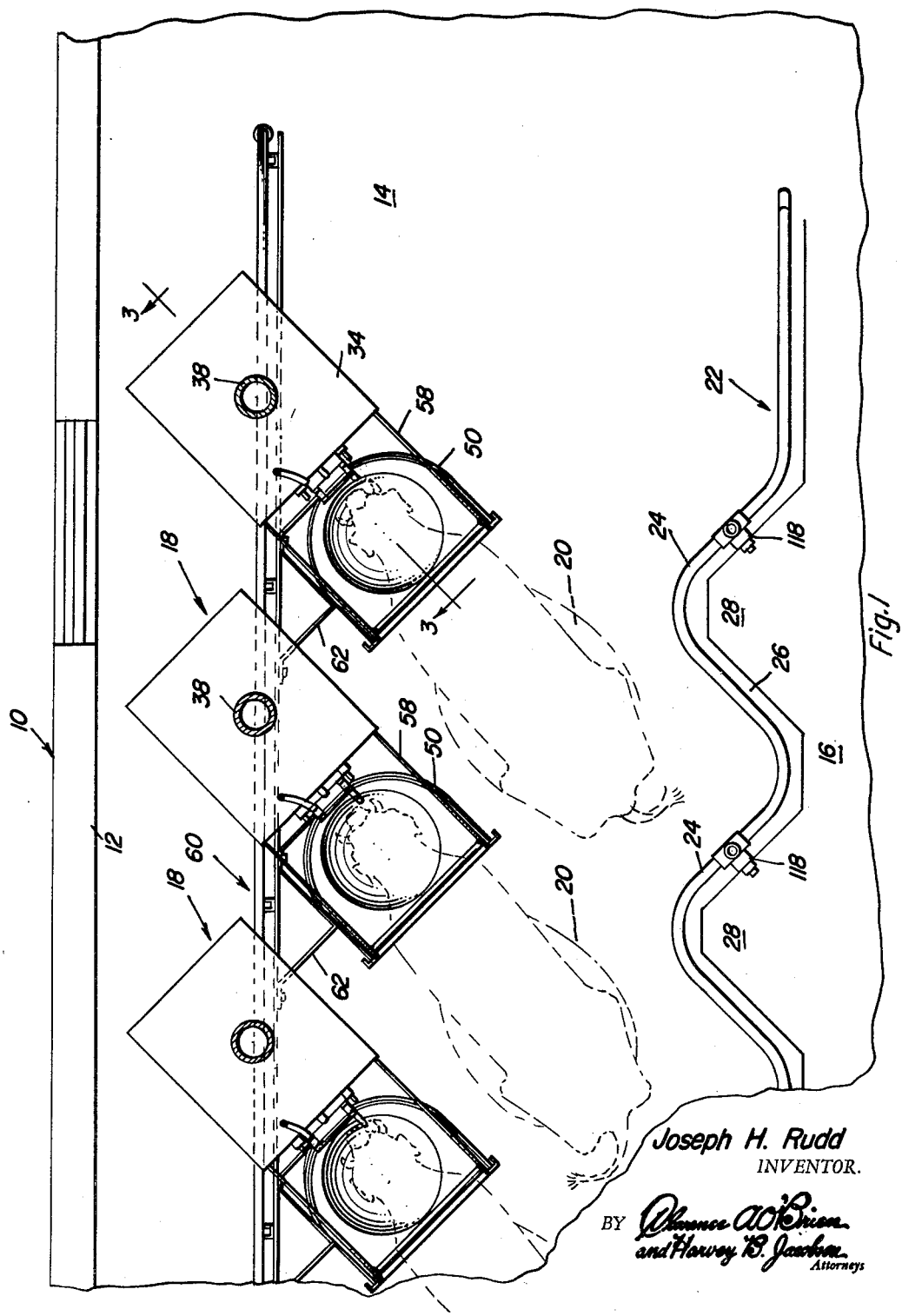
FIGURE 1 is a top plan view of a portion of a milking barn with the roof thereof removed and showing the manner in which a plurality of feeder assemblies are disposed about a central area for workmen and arranged in a manner so as to present the right side of the hind portion of each cow immediately adjacent the central area for workmen, parts of the feeder assemblies being shown in section.
Figure 2:
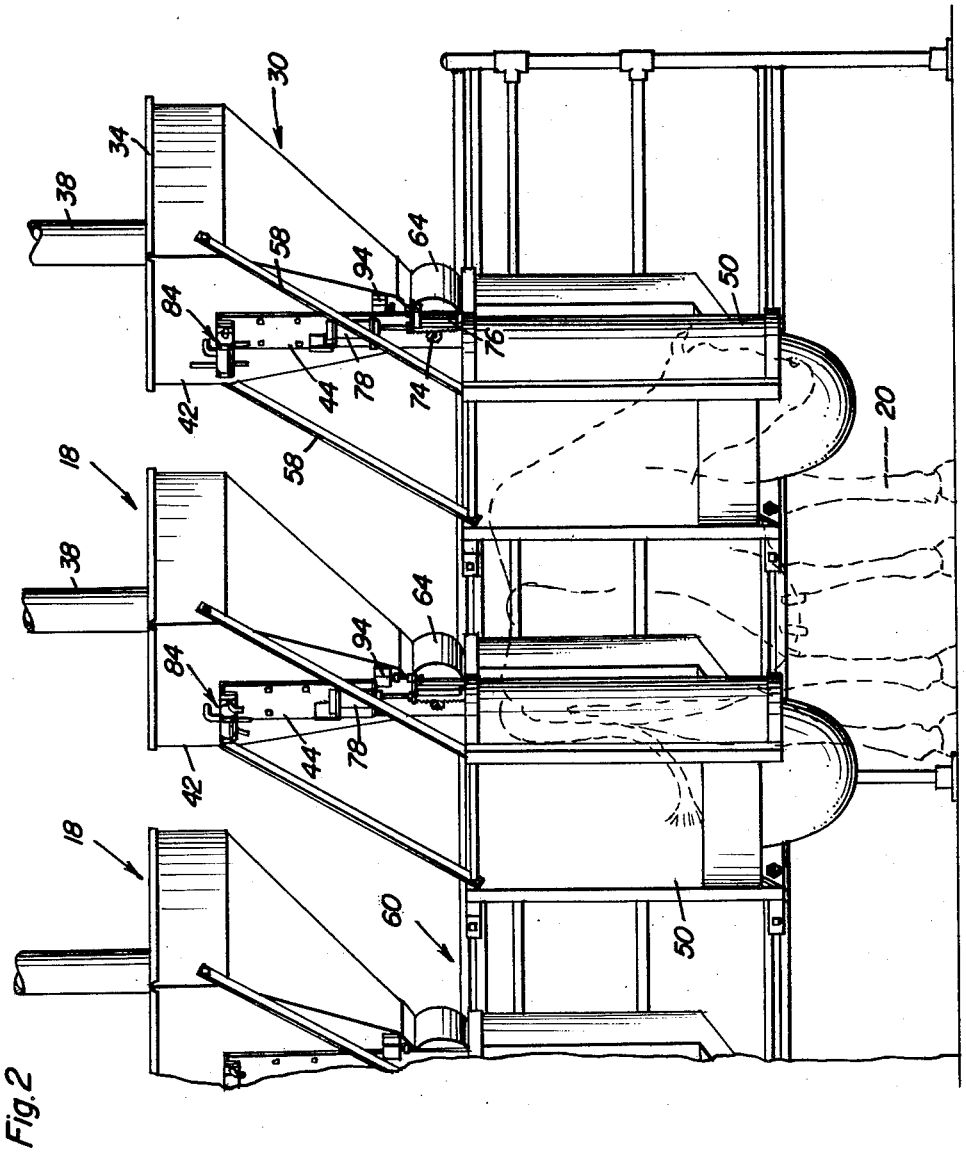
FIGURE 2 is a fragmentary side elevational view of the portion of the milking barn illustrated in FIGURE 1.

Referring now more specifically to the drawings the numeral 10 generally designates a milking barn which includes a roof supporting wall 12. The barn 10 includes a floor 14 and a central recessed pit 16 is formed in the floor 14. A plurality of feeder units generally designated by the reference numeral 18 are disposed about the pits 16 along opposite sides thereof. From FIGURE 1 of the drawings it will be noted that each feeder unit 18 is inclined relative to the wall 12 so that the cows 20 will have the same side of their hind portions immediately adjacent the pit 16. A railing generally designated by the reference numeral 22 is provided for preventing the cows from falling in the pit 16 and the railing 22 includes a plurality of V-shaped sections 24 for properly positioning the cows 20 in the stalls defined by the feeder units 18. It will be noted that the pit 16 includes side walls 26 which conform to the contour of the railing 22 and define outwardly projecting pockets 28 which extend outwardly to a point immediately adjacent the right side of the hind portion of the corresponding cow 20.

As will hereinafter become apparent during the discussion of FIGURE 7 the pit 16 is centrally disposed between a pair of rows of feeder units 18 in order that workmen in the pit may attach milking equipment to each cow 20 without leaving the pit 16. In addition, as will also hereinafter become apparent, the workmen in the pit 16 may readily actuate the control means for each feeder unit in order that a predetermined quantity of feed may be dispensed into the feed receptacle of each feeding unit at the discretion of the workmen.

With attention now directed more specifically to FIGURES 2 through 6 of the drawings it will be noted that each feeder unit 18 includes a feed reservoir generally designated by the reference numeral 30. The reservoir 30 has a reduced neck portion 32 at its lower end and includes a removable top wall 34 having an opening 36 formed therein about which one end of an inlet conduit 38 is secured. The feed 40 may be placed within each reservoir 30 by removing the top wall 34 thereof or by passing the feed through the inlet conduit 38 from the upper end thereof. Each reservoir 30 also includes a front wall 42 to which a mounting bracket or plate 44 is removably secured by means of any suitable fasteners 46. The lower portion of the neck portion 32 terminates in a depending conduit 48 which opens at its lower end into a guard 50 as at 52 at a point spaced above the feed receptacle 54.

The guard 50 is generally U-shaped in plan and the feed receptacle 54 has a closed bottom 56 and is open at its top to receive feed from the conduit 48 and to enable a cow 20 having its head disposed within the confines of the guard 50 to feed from the feed 40 within the receptacle 54. Inasmuch as the guard 50 and receptacle 54 of each feeder unit 18 are supporting the reservoir 30 thereof, suitable bracing members 58 are secured between the upper portions of each guard 50 and the corresponding reservoir 30. Additionally, if it is desired, the guards 50 may be secured to the railing generally designated by the reference numeral 60 passing behind the feeding units 18 by means of bracket assemblies 62.

The conduit 48 has a transversely extending cylindrical enlargement 64 formed therein and a dispensing drum generally designated by the reference numeral 66 is rotatably journaled in the cylindrical enlargement by means of stub axles 68 and 70 carried by opposite ends of the dispensing drum 66. The dispensing drum 66 is actually carried by the mounting bracket or plate 44 and is insertable through an opening 72 formed in the front wall 42 of the reservoir 30.

Secured to the outer end of the stub axle 70 is a gear 74 which is meshed with a rack gear 76. The rack gear 76 is secured to the piston rod 78 of a double acting fluid cylinder 80 having a piston (not shown) disposed therein. Inlet lines 80 and 82 communicate opposite end portions of the cylinder 78 with a valve assembly generally designated by the reference numeral 84. It will be noted that the cylinder 78 is provided with suitable means in the form of brackets 86 and 88 for mounting the cylinder 78 on the mounting bracket or plate 44. The rack gear 76 has a laterally projecting abutment arm 90 secured thereto whose free end is provided with an adjustable abutment 92. A venting or discharge valve 94 is mounted on the plate 44 in any convenient manner and has an actuator 96 engageable by the abutment 92 upon retraction of the piston rod 78. A vent line 98 communicates the interior of the vent valve 94 with the interior of the valve assembly 84 and in particular the interior portion of the valve assembly 84 with which the intake line 82 is communicated.

A control or throttling valve 100 is interposed in each of the lines 80 and 100 and may be adjusted to establish a maximum rate at which fluid may pass therethrough.

As can best be seen in FIGURE 6 of the drawings the dispensing drum 66 has an opening 102 formed therein which is selectively registrable with the bottom of the reservoir 30 and the portion of the conduit 48 disposed immediately below the cylindrical enlargement 64 where upon oscillation of the drum 66 the interior thereof may be communicated with first the interior of the reservoir 30 and then the portion of the conduit 48 disposed immediately below the circular enlargement 64. In this manner, measured quantites of feed 40 may be dispensed from the reservoir 30 into the feed receptacle 54 upon actuation of the fluid cylinder 78.

With attention now directed to FIGURE 7 of the drawings it will be noted that each of the feeder units 18 has its valve assembly 84 communicated with a pressurized fluid supply line 106 which receives its source of compressed fluid from a compressor generally designated by the reference numeral 108. A regulator generally designated by the reference numeral 110 and an oiler generally designated by the reference numeral 112 are disposed in the main supply line 106. A branch line 114 communicates each of the valve assemblies 84 with the main supply line 106 and each valve assembly is provided with a vent line 116 which is in communication with the portion of the interior of the associated valve assembly 84 servicing the intake line 80. The vent line 116 has a venting valve 118 on one end and each of the vent lines 116 is communicated with a venting valve 118' by means of vent line 116'. The venting valves 118' for the feeder units 18 on each side of the pit 16 are mounted on a separate main control block 120. The main control blocks 120 may be conveniently placed by a doorway (not shown) of the barn through which the cows 20 enter to be milked. Thus, a workman positioned at the doorway may note which feeder units 18 cows are positioned adjacent and actuate the cylinder 78 of each of those feeder units 18 by manipulating the associated vent valves 118' on the blocks 120. Additionally, it is to be noted that each of the vent valves 118 is mounted immediately adjacent the corresponding pocket 28 of the pit 16 whereby the vent valves 118 may be manipulated by a workman in the pit to actuate the associated feeding units 18.

In operation, the cows 20 are allowed to enter the barn 10 and they are directed to the feed receptacles 54. After the cows 20 have been positioned in the stalls defined by the feeder units 18, either of the vent valves 118 or 118' may be actuated to vent the pressure from the intake lines 82 whereby the greater pressure in the intake lines 80 will effect retraction of the piston rod 78 and the oscillation of the dispensing drum 66 in one direction. Upon movement of the piston rod 78 to the retracted position the associated abutment 92 will engage the actuator 96 of the associated vent valve 94 which will in turn vent the pressure from the intake line 80 thereby enabling the greater pressure within the intake line 82 to again return the dispensing drum 66 to an upwardly opening position thereby enabling a further quantity of feed 40 from the associated reservoir 30 to enter the dispensing drum 66 in preparation to its subsequent discharge into the associated feed receptacle 54.

Thus, it will be noted that each of the vent valves 118 and 118' need be manipulated only for a short period of time to vent a sufficient quantity of pressure from the associated intake line 82 whereby the pressure in the corresponding intake line 80 will effect retraction of the piston rod 78 and subsequent extension of the piston rod 78 after actuation of the associated vent valve 94 and the venting of the corresponding intake line 80 thereby.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A selectively controlled feeder comprising a plurality of feeder units, feed reservoir means connected with each of said feeder units including dispensing means for dispensing feed from said reservoir means into said feeder units, said dispensing means including an actuator for each of said feeder units, said actuators each having a control means operable remote from said actuators, each of said actuators comprising a double acting fluid cylinder having a piston therein, a pair of inlet lines communicating with opposite end portions of said cylinder, said control means each including means for admitting fluid under pressure to both of said inlet lines and first remotely operable vent means communicating solely with one of said lines for temporarily venting said one line whereby the greater pressure in said other line will offset movement of the piston in one direction, and second vent means communicating solely with said other line and operable in response to a predetermined movement of said piston in said one direction for temporarily venting said other line whereby said piston will be returned to its starting position.

2. The combination of claim 1 wherein said venting means for said other line includes an abutment member connected to said piston.

3. A selectively controlled feeder comprising a plurality of feeder units, feed reservoir means connected with each of said feeder units including dispensing means for dispensing feed from said reservoir means into said feeder units, said dispensing means including an actuator for each of said feeder units, said actuators each having a control means operable remote from said actuators, each of said actuators comprising a double acting fluid cylinder having a piston therein, a pair of inlet lines communicating with opposite end portions of said cylinder, said control means each including means for admitting fluid under pressure to both of said inlet lines and first remotely operable vent means communicating solely with one of said lines for temporarily venting one line whereby the greater pressure in said other line will offset movement of the piston in one direction, and second vent means communicating solely with said other line and operable in response to a predetermined movement of said piston in said one direction for temporarily venting said other line whereby said piston will be returned to its starting position, each of said inlet lines including valve means adjustably controlling the speed of fluid through said inlet lines.

References Cited in the file of this patent
UNITED STATES PATENTS

| | | |
|---|---|---|
| 1,079,613 | Studman | Nov. 25, 1913 |
| 2,176,008 | Hoyt | Oct. 10, 1939 |
| 2,942,574 | Golay | June 28, 1960 |
| 2,969,039 | Golay | Jan. 24, 1961 |

OTHER REFERENCES

"The Way Cows Will Be Milked On Our Farm Tomorrow," published by Babson Bros. Dairy Research Service, 1959.